(12) United States Patent
Tanabe et al.

(10) Patent No.: US 6,336,323 B1
(45) Date of Patent: Jan. 8, 2002

(54) BRAKE FOR A HYDRAULIC MOTOR

(75) Inventors: Sadayuki Tanabe; Tatsuya Narumi, both of Gifu (JP)

(73) Assignee: Teijin Seiki Co., Ltd., Tokyo (JP)

( * ) Notice: Subject to any disclaimer, the term of this patent is extended or adjusted under 35 U.S.C. 154(b) by 5 days.

(21) Appl. No.: 09/608,538

(22) Filed: Jun. 30, 2000

(30) Foreign Application Priority Data

Jul. 8, 1999 (JP) .......................................... 11-193952

(51) Int. Cl.[7] .......................... F16D 31/02; F15B 15/26
(52) U.S. Cl. ............................... 60/442; 92/21 R; 92/28
(58) Field of Search ........................... 60/442; 92/21 R, 92/28; 188/72.3, 170

(56) References Cited

U.S. PATENT DOCUMENTS 5,697,286 A * 12/1997 Grahl ............................ 92/24

* cited by examiner

*Primary Examiner*—Edward K. Look
*Assistant Examiner*—Michael Leslie
(74) *Attorney, Agent, or Firm*—Akin, Gump, Strauss, Hauer & Feld, L.L.P.

(57) ABSTRACT

In a brake (53) for a hydraulic motor (10), a braking piston (66) is added that can move toward and away from fixed friction discs (54) and rotating friction discs (55). A braking passage (73) leads a high-pressure fluid into the braking piston (66) to press the braking piston (66) to the friction discs (54, 55).

8 Claims, 2 Drawing Sheets

BRAKE FOR A HYDRAULIC MOTOR

BACKGROUND OF THE INVENTION

The present invention relates to a brake that exerts a braking force to a revolving portion of a hydraulic motor.

In recent years, a hydraulic motor is used for driving a construction machine such as an asphalt finisher and the like. In the case where a hydraulic motor is mounted on a construction machine, the machine should be equipped with a parking brake that exerts a braking force to the hydraulic motor while the supply of a driving fluid to the construction machine is suspended.

A typical brake of this kind includes one or more fixed friction discs connected to a fixed portion of the hydraulic motor so as to move in the direction of the axis, one or more rotating friction discs connected to the revolving portion of the hydraulic motor so as to move in the direction of the axis and to rotate as a single unit, a spring for exerting a pressing force to the fixed friction discs and the rotating friction discs to bring these friction discs into frictional contact with respect to each other, a releasing piston provided between the spring and the fixed friction discs and the rotating friction discs for transmitting a pressing force exerted by the spring when it moves closer to the fixed friction discs and the rotating friction disc by being pressed by the spring, and a releasing passage for moving the releasing piston away from the fixed friction discs and the rotating friction discs to release the fixed friction disc and the rotating friction discs from frictional contact with respect to each other.

Since the construction machine as described above is a motor vehicle that is driven on the public road, it is required to be equipped with a brake such as a disc brake or a drum brake, which exerts a braking force to the vehicle as needed in addition to a parking brake as described above according to the safety standard for the road transportation vehicles.

In the construction machines, since it is required to provide a brake that exerts a braking force as needed in addition to a parking brake, there is recognized disadvantages in that the braking system is forced to be upsized as a whole and that the cost is increased.

SUMMARY OF THE INVENTION

Accordingly, it is an object of the present invention to provide a brake for a hydraulic motor, which is smaller in size, lower in price, and higher in the level of safety.

This object may be achieved by providing a brake for a hydraulic motor disposed between the fixed portion of a hydraulic motor and the rotating portion of the hydraulic motor that rotates when a driving fluid is fed thereto for braking the rotating portion, wherein the rotating portion is braked when the supply of the driving fluid is being suspended and released when the supply of driving fluid is being supplied, which brake comprising: one or more fixed friction discs connected to the fixed portion so as to move in the direction of the axis, one or more rotating friction discs connected to the rotating portion so as to move in the direction of the axis and to rotate as a single unit, a spring for exerting a pressing force to the fixed friction disc and the rotating friction discs to bring these friction discs into frictional contact with respect to each other, a releasing piston disposed between the spring and the fixed friction discs and said rotating friction discs for transmitting a pressing force exerted by the spring to these friction discs when it moves closer to the fixed friction discs and the rotating friction discs by being pressed by the spring, a releasing passage for moving the releasing piston away from the fixed friction disc and the rotating friction discs by leading the driving fluid being fed to the hydraulic motor to the releasing piston to release the fixed friction disc and the rotating friction discs from frictional contact with respect to each other, a braking piston supported on the fixed portion so as to move in the direction of the axis, and a braking passage for pressing the braking piston against the fixed friction discs and the rotating friction discs by leading a high pressure fluid to the braking piston to bring these fixed friction discs and rotating friction discs into frictional contact with respect to each other.

When a driving fluid is fed to the hydraulic motor, the rotating portion of the hydraulic motor rotates, and at the same time, the driving fluid is conducted to the releasing piston as well through the releasing passage, so that the releasing piston moves against the pressing force exerted by the spring away from the fixed friction discs and the rotating friction discs to release the fixed friction discs and the rotating friction discs from frictional contact with respect to each other.

Thus, in order to brake the rotating hydraulic motor as needed, a high pressure fluid is led through the braking passage to the braking piston, and the braking piston is moved axially to the fixed friction discs and the rotating friction discs. When the braking piston is pressed against the fixed friction discs and the rotating friction discs, these fixed friction discs and the rotating friction discs is brought into frictional contact with respect to each other so that the rotating portion of the hydraulic motor is braked. Therefore, only by adding a braking piston and a braking passage, a braking force may be exerted to the hydraulic motor any time, and thus a downsized brake with higher safety may be realized at a low cost.

When the supply of a driving fluid to the above-described hydraulic motor is suspended, the rotating portion stops rotating. At that time, since the supply of driving fluid to the releasing piston is also suspended, the releasing piston is moved closer to the fixed friction discs and the rotating friction discs by being pressed by the spring to transmit the pressing force of the spring to the fixed friction discs and the rotating friction discs. Consequently, the fixed friction discs and the rotating friction discs are brought into frictional contact with respect to each other to brake the rotating portion of the hydraulic motor.

By constituting a brake as described in the second aspect of the present invention, the releasing piston and the braking piston are radially overlapped so that the axial length of the brake may be shortened.

The present disclosure relates to the subject matter contained in Japanese patent application No. Hei. 11-193952 (filed on Jul. 8, 1999), which is expressly incorporated herein by reference in its entirety.

DESCRIPTION OF THE PREFERRED EMBODIMENT

Figure 1:
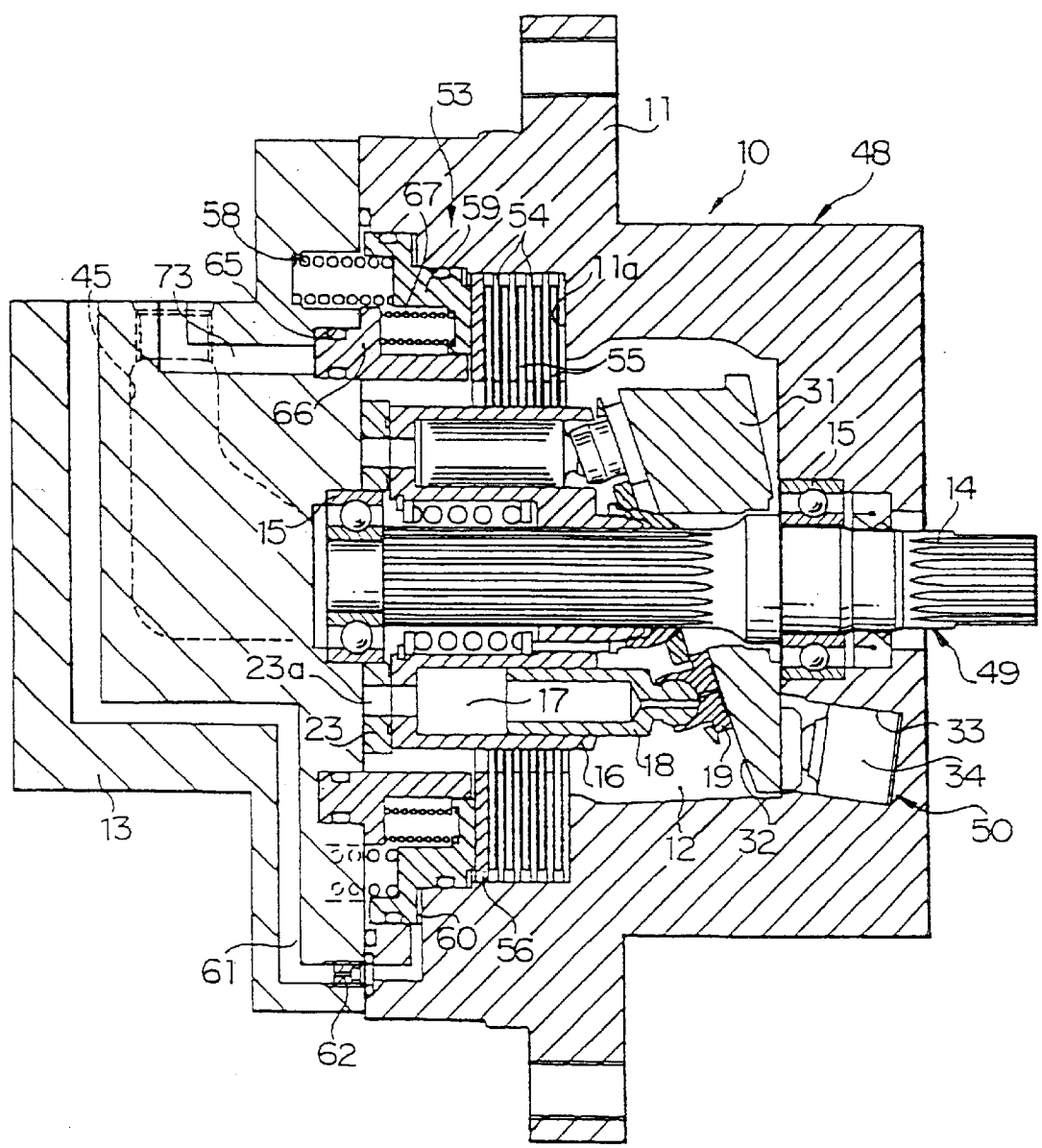
FIG. 1 is a front cross-sectional view illustrating an embodiment of the present invention.

Referring now to the drawings, an embodiment of the present invention is now described.

Figure 2:
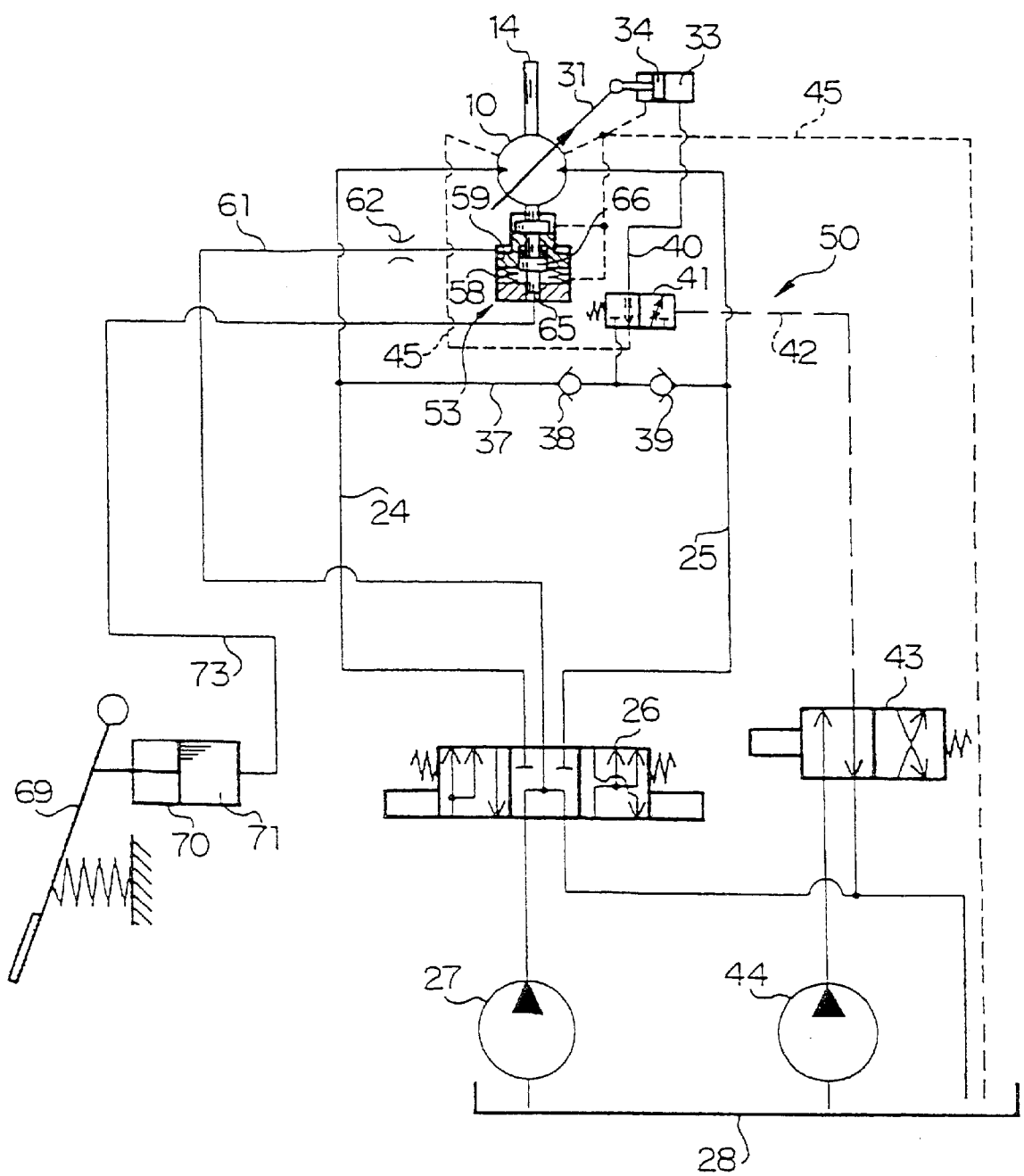
FIG. 2 is a circuit diagram of the embodiment of FIG. 1.

In FIG. 1 and FIG. 2, a reference numeral 10 denotes a swash plate type hydraulic motor mounted on the main frame of for example a construction machine, comprising a fixed casing 11 having a storage chamber 12 therein and a side block 13 fixed on one end surface of the fixed casing 11 for closing an opening on one end of the storage chamber 12. A reference numeral 14 denotes a drive shaft stored in the storage chamber 12, which is rotatably supported via bearings 15 at one end by a side block 13 and at the other end by the fixed casing 11, and the center portion thereof is placed in the storage chamber 12 without any support. A reference numeral 16 is a cylindrical cylinder block accommodated within the storage chamber 12, through which the drive shaft 14 is inserted and connected by means of a spline. In a plurality of cylinder holes 17 formed on the cylinder block 16, plungers 18 are slidably inserted respectively, and a shoe 19 is connected to the tip of each plunger.

A reference numeral 23 denotes a timing plate provided disposed between the cylinder block 16 and the side block 13, and provided with a pair of feed-and-drainage holes 23a with which half of the cylinder holes 17 are in communication respectively. Reference numerals 24, 25 are a pair of main passages each connected at one end to each feed-and-drainage hole 23a. A directional control valve 26 mounted at the driver's seat is connected to the other ends of these main passages 24, 25, and a hydraulic pump 27 and a tank 28 are connected to the directional control valve 26. By switching the directional control valve 26, one of the main passages 24, 25 serves as a feeding passage and the other as a draining passage.

A reference numeral 31 is an almost ring-shaped swash plate accommodated within the storage chamber 12 on the opposite side of the cylinder block 16. On one end surface of the swash plate 31 is provided with a bevel 32, and the shoe 19 as described above is in sliding contact with the bevel 32. On the other end surface of the swash plate, there are provided two flat surfaces, and a fulcrum member is disposed on the boundary of these flat surfaces. A reference numeral 33 denotes a cylinder chamber formed on the other end surface of the storage chamber 12, where a piston 34 abutting the other end surface of the thinner portion of the swash plate 31 is slidably received.

A reference numeral 37 is a selection passage 37 for connecting the main passages 24 and 25 with each other, which selects either one of the main passages 24 and 25 that has a higher pressure and takes a driving fluid out by means of a pair of check valves 38, 39 provided midway thereof. A reference numeral 40 is a slantwise-rotating passage connecting the selection passage 37 between the check valves 38 and 39 and the cylinder chamber 33, which includes a control valve 41 for controlling the feed and drainage of the driving fluid taken from the selected one of the main passages 24, 25 to/from the cylinder chamber 33 provided midway thereof. A reference numeral 42 denotes a pilot passage connecting the control valve 41 and the directional control valve 43 mounted at the driver's seat. The pilot passage 42 works in such a manner that when the directional control valve 43 is switched to the position of cross current flow, the high pressure fluid from the hydraulic pump 44 is led to the control valve 41 and the driving fluid taken from any one of the main passages 24, 25 is fed through the slantwise-rotating passage 40 to the cylinder chamber 33 by switching the control valve 41 to the feeding position, while when the directional control valve 43 is switched to the position of parallel current flow, the fluid contained therein is drained to the tank 28 and the control valve 41 is switched to the drainage position to drain the fluid in the cylinder chamber 33 through the drain passage 45 to the tank 28.

When the piston 34 is projected or retracted by the control valve 41 being switched to the feeding position or the drainage position, the stroke of the plunger 18 in the cylinder block 16 is switched into two levels by the slantwise rotation of the swash plate 31, and thus the output revolution of the drive shaft 14 is switched into two levels so that a wide range revolution control may be carried out.

The fixed casing 11, the side block 13, the timing plate 23, and the swash plate 31 together constitute the fixed portion 48, and the drive shaft 14, cylinder block 16, the plunger 18, and the shoe 19 together constitute the rotating portion 49 that rotates when the driving fluid is being fed, and in turn the fixed portion 48 and the rotating portion 49 together constitutes the hydraulic motor 10 of which the revolution is changed in two levels due to the angular position of slantwise rotation of the swash plate 31 changed in two levels. The cylinder chamber 33, the piston 34, the selection passage 37, the check valves 38 and 39, the slantwise-rotating passage 40, the control valve 41, the pilot passage 42, the directional control valve 43, and the fluid pump 44 together constitute a slantwise-rotating means 50 for rotating the swash plate 31 about the fulcrum member between two angular positions of slantwise rotation A reference numeral 53 denotes a brake for braking the rotating portion 49 of the hydraulic motor 10 when the supply of the driving fluid is being suspended, that is, when the rotation of the hydraulic motor is suspended. The brake 53 is disposed between the fixed portion 48 and the rotating portion 49, and more specifically, between the fixed casing 11 and the cylinder block 16. The brake 53 comprises more than one (five) ring-shaped fixed friction discs 54, and these fixed friction discs 54 are connected to the fixed casing 11 so as to slide axially by coupling the peripheral portions thereof to the fixed portion 48, and more specifically to the inner periphery of the storage chamber 12 of the fixed casing by means of splines.

A reference numeral 55 is more than one (five) ring-shaped rotating friction discs. The rotating friction discs 55 are disposed alternately with the fixed friction discs 54. The inner peripheral portions of these rotating friction discs 55 are coupled to the rotating portion 49, and more specifically to the outer periphery of the cylinder block 16 by means of splines, and thus these rotating friction discs 55 are connected to the cylinder block 16 so as to move in the direction of the axis and to rotate as a single unit. A reference numeral 56 is a ring-shaped intermediate plate disposed on one side of the rotating friction disc 55 which is disposed nearest to that side, and the outer periphery of the intermediate plate 56 is also connected to the fixed casing by means of a spline.

A reference numeral 58 denotes a plurality of springs disposed on one side of the fixed friction discs 54, rotating friction discs 55, and the intermediate plate 56. The springs 58 are disposed peripherally at equal intervals and each engaged at one end to the side block 13. The springs 58 exert a braking force to the rotating portion 49 of the fluid motor 10 by bringing the fixed friction discs 54 and the rotating frictions discs 55 into frictional contact with respect to each other by exerting a pressing force directing toward the other side via a releasing piston 50 which will be described below to the fixed friction discs and the rotating friction discs 55 so that the fixed friction discs 54 and the rotating frictions discs 55 are pressed against the stepped surface 11a.

A reference numeral 59 is a releasing piston slidably inserted in the fixed casing 11 and being almost cylindrical in shape. The releasing piston 59 is disposed between the fixed friction disc 54, the rotating friction disc 55 and the intermediate plate 56, and the springs 58. Consequently, the releasing piston 59 transmits a pressing force directing toward the other side of the springs 58 to the fixed friction discs 54 and the rotating friction discs 55 when it is brought closer to the fixed friction discs 54 and the rotating frictions discs 55 by being pressed by the springs.

A reference numeral 60 is a cylinder chamber formed between the fixed casing 11 and the releasing piston 59. The cylinder chamber 60 is connected to the directional control valve 26 via the releasing passage 61. Since the releasing passage 61 is fed with the driving fluid from the hydraulic pump 27 when the directional control valve 26 is switched to the flowing position, that is when the driving fluid is fed to the hydraulic motor 10, the releasing passage 61 lead the driving fluid to the cylinder chamber 60, that is, to the other side of the releasing piston to move the releasing piston 59 to one side against the springs 58. Consequently, the releasing piston 59 moves away from the fixed friction discs 54 and the rotating frictions discs 55 so that the fixed friction discs 54 and the rotating frictions discs 55 are released from frictional contact, and thus the rotating portion 49 is released from being braked.

On the other hand, when the directional control valve 26 is switched to the neutral position, that is, when the supply of the driving fluid to the hydraulic motor 10 is being suspended, the fluid in the cylinder chamber 60 is drained through the releasing passage to the tank 28 since the releasing piston 59 moves closer to the fixed friction discs 54 and the rotating frictions discs 55 by being pressed by the springs 58. Consequently, the fixed friction discs 54 and the rotating friction discs 55 are brought into frictional contact with respect to each other to exert a braking force to the rotating portion 49 of the hydraulic motor 10. A reference numeral 62 is a restriction disposed midway of the releasing passage 61, which restricts the flow of the fluid drained from the cylinder chamber 60 to prevent a braking force from being exerted instantaneously.

A reference numeral 65 is an annular cylinder chamber formed on the other end surface of the side block 13, in which one end portion of the almost cylindrical braking piston 66 is slidably inserted, an thus the braking piston 66 is supported by the fixed portion so as to move in the direction of the axis. The braking piston 66 is disposed radially inner side of the releasing piston 59 so that the releasing piston 59 and the braking piston 66 is overlapped in the direction of radius, and thus the length of the hydraulic motor 10 may be shortened. A reference numeral 67 is a reset spring disposed between the braking piston 66 and the releasing piston 59. The reset spring 67 serves to move the braking piston 66 away from the fixed friction discs 54 and the rotating friction discs 55 back to the end of one side, and has a smaller spring constant than the springs 58. A reference numeral 69 is a foot pedal that mounted near the driver's seat for swinging movement, to which the piston 71 of the cylinder 70 is connected.

Reference numeral 73 is a braking passage connecting the cylinder 70 and the cylinder chamber 65. The braking passage 73 moves the braking piston 66 toward the other side to press against the fixed friction discs 54 and the rotating friction discs 55 by leading the high pressure fluid squeezed out the cylinder 70 by the piston 71 to the cylinder chamber 65 and the braking piston 66 when the pedal is being pressed. Consequently, these fixed friction discs 54 and the rotating friction discs 55 are brought into frictional contact with respect to each other to exert a braking force to the rotating portion 49 of the hydraulic motor 10.

The effect of the present invention will now be described.

Assuming that the directional control valve 26 is switched to the flowing position and the plunger 18 in the cylinder hole 17 projects toward the swash plate 31 and is pressed against the bevel 32 for example by the driving fluid being supplied from the hydraulic pump 27 to any of cylinder hole 17. In such a case, since the tip of the plunger 18 is in sliding contact with the bevel 32 via the shoe 19, a component force of the pressing force in the peripheral direction is exerted to the plunger, which allow the plunger 18 and the shoe 19 to slide on the bevel 32 to drive and rotate the rotating portion 49 such as the plunger 18, cylinder block 16, the drive shaft 14 and so on as a single unit. Then, the rotation of the drive shaft 14 is transmitted via a speed reducer to the wheel of construction machine or to a sprocket for driving a crawler to drive the construction machine. On the other hand, the fluid in the rest of the cylinder holes is squeezed out by the plunger 18 and drained via the main passage 25 to the tank 28.

Since the driving fluid is led via the releasing passage 61 to the releasing piston 59 as well when the driving fluid is being supplied to the hydraulic motor 10, the releasing piston 59 moves against the pressing force of the spring 58 to the side away from the fixed friction discs 54 and the rotating friction disc 55 to release the fixed friction discs 54 and the rotating friction discs 55 from frictional contact with respect to each other. Thus, the rotating portion 49 is free from braking and rotated without problem.

In order to brake the rotating hydraulic motor 10 any time, the high-pressure fluid is led from the cylinder 70 to the cylinder chamber 65 via the braking passage 73 by pressing the foot pedal 69 and the braking piston 66 is axially moved to the other side toward the fixed friction discs 54 and the rotating friction discs 55. When the braking piston 66 is pressed against the fixed friction discs 54 and the rotating friction discs 55, the fixed friction discs 54 and the rotating friction discs 55 are brought into frictional contact with respect to each other so that a braking force is exerted to the rotating portion 49 of the hydraulic motor 10, and the construction machine stops driving. Thus, only by adding the braking piston 66 and the braking passage 73, a braking force may be exerted to the hydraulic motor 10 any time and thereby a downsized brake with higher safety my be provided at low cost.

When the directional valve 26 is switched to the neutral position where the supply of the driving fluid to the hydraulic motor 10 is suspended, the rotating portion 49 stops rotating and thereby the construction machine stops traveling. At this time, since a driving fluid is not fed to the releasing piston, the releasing piston 59 is pressed by the spring 58 and moved closer to the fixed friction discs 54 and the rotating friction discs, and thus the pressing force exerted by the springs 58 is transmitted to the fixed friction discs 54 and the rotating friction discs 55. Consequently, the fixed friction discs 54 and the rotating friction discs 55 are brought into frictional contact with respect to each other to exert a braking force to the rotating portion 49 of the fluid motor 10, when parked.

Although in the above-described embodiment, the braking piston 66 is disposed on one side of the fixed friction discs 54 and the rotating friction discs 55, the braking piston may be disposed on the other side of the fixed friction discs and the rotating friction discs according to the present invention. In such a case, the fixed friction discs and the rotating friction discs are pressed against the releasing piston by the braking piston. Although in above-described embodiment, the high-pressure fluid is fed to the braking piston 66 by means of a foot pedal 69, the high-pressure fluid from the hydraulic pump may be fed by switching the control valve with an operating lever in this invention.

As described so far, according to the present invention, a downsized brake with higher safety may be provided at a low cost.

What is claimed is:

1. A brake for a hydraulic motor having a fixed portion and a rotating portion rotatable relative to the fixed portion, the brake comprising:

one or more fixed friction plates connected to the fixed portion, and movable in an axial direction;

one or more rotating friction discs connected to the rotating portion, and movable in the axial direction and rotatable together with the rotating portion;

a spring for exerting a pressing force to said fixed and rotating friction plates to frictionally contact these friction plates together;

a releasing piston, disposed between said spring and said fixed and rotating friction plates, for transmitting the pressing force exerted by said spring to the friction plates;

a releasing passage for introducing a driving fluid fed to the hydraulic motor to said releasing piston to move said releasing piston away from said fixed and rotating friction plates, thereby releasing the frictional contact between the fixed and rotating friction plates;

a braking piston supported on said fixed portion and movable in the axial direction; and a braking passage for introducing a high pressure fluid to said braking piston to press said braking piston against said fixed and rotating friction plates, there by frictionally contacting the fixed and rotating friction plates together.

2. A brake for a hydraulic motor as set forth in claim 1, wherein said releasing piston is formed in an approximately cylindrical shape and the braking piston is disposed radially inside the releasing piston.

3. A brake for a hydraulic motor as set forth in claim 1, wherein simultaneously when the driving fluid is supplied to the hydraulic motor to drive the hydraulic motor, the driving fluid is also introduced into the releasing piston through the releasing passage to release the frictional contact between the fixed and rotating friction plates.

4. A brake for a hydraulic motor as set forth in claim 3, wherein when a foot pedal is depressed during driving of the hydraulic motor, the high pressure fluid is introduced into the braking piston through the braking passage to establish the frictional contact between the fixed and rotating friction plates regardless of position of the releasing piston.

5. A brake for a hydraulic motor as set forth in claim 4, wherein when supply of the driving fluid to the hydraulic motor is suspended, the releasing piston is forced by the spring to establish the frictional contact between the fixed and rotating friction plates regardless of position of the braking piston.

6. A brake for a hydraulic motor having a fixed portion and a rotating portion rotatable relative to the fixed portion, the brake comprising:

a friction unit having at least one fixed plate coupled to the fixed portion and at least one rotating plate coupled to the rotating portion;

a releasing piston biased toward the friction unit;

a releasing passage through which a hydraulic pressure can be applied to the releasing piston against a biasing force applied to the releasing piston;

a braking piston biased away from the friction unit, and movable independently of the releasing piston; and a braking passage through which a hydraulic pressure can be applied to the braking piston against a biasing force applied to the braking piston.

7. A brake for a hydraulic motor as set forth in claim 6, wherein the releasing piston is contactable with a radially outward portion of the friction unit, and the braking piston is contactable with a radially inward portion of the friction unit.

8. A brake for a hydraulic motor as set forth in claim 6, wherein a spring is interposed between the releasing piston and the braking piston.

* * * * *